(12) United States Patent
Halfen

(10) Patent No.: US 8,678,061 B1
(45) Date of Patent: Mar. 25, 2014

(54) APPARATUS AND METHOD OF ATTACHING A FILE FASTENER TO A BACKBOARD

(75) Inventor: Marvin J. Halfen, Hastings, MN (US)

(73) Assignee: Smead Manufacturing Company, Hastings, MN (US)

( * ) Notice: Subject to any disclaimer, the term of this patent is extended or adjusted under 35 U.S.C. 154(b) by 63 days.

(21) Appl. No.: 13/477,621

(22) Filed: May 22, 2012

(51) Int. Cl.
B32B 37/06 (2006.01)
B29C 65/00 (2006.01)
B29C 65/78 (2006.01)

(52) U.S. Cl.
CPC ............. *B29C 66/003* (2013.01); *B29C 65/787* (2013.01); *B29C 66/472* (2013.01); *B29C 66/8161* (2013.01); *B32B 37/06* (2013.01)
USPC ............................ 156/499; 156/566; 156/580

(58) Field of Classification Search
CPC  B29C 65/4815; B29C 65/787; B29C 66/003; B29C 66/0242; B29C 66/347; B29C 66/472; B29C 66/8161; B32B 37/02; B32B 37/06; B32B 37/1292
USPC ............................................ 156/499, 566, 580
See application file for complete search history.

(56) References Cited

U.S. PATENT DOCUMENTS

| | | | | |
|---|---|---|---|---|
| 4,216,051 A | * | 8/1980 | Brown et al. | 156/499 |
| 5,421,320 A | * | 6/1995 | Brown | 126/299 R |
| 2008/0245359 A1 | * | 10/2008 | Williamson | 126/39 |

* cited by examiner

*Primary Examiner* — Katarzyna Wyrozebski Lee
*Assistant Examiner* — John Blades
(74) *Attorney, Agent, or Firm* — Altera Law Group, LLC

(57) ABSTRACT

A method and apparatus for the attachment of file fastener to a backboard is disclosed. Backboard, usually pressboard is resistant to attachment by hot melt glue. This problem is overcome by providing deflector for increasing the heat retention angled to provide a chimney effect, pressing the fastener at its tangs toward the heating element, and providing an elastic anvil and hammer which distribute force over a longer period of time.

14 Claims, 9 Drawing Sheets

APPARATUS AND METHOD OF ATTACHING A FILE FASTENER TO A BACKBOARD

BACKGROUND

1. Field of the Disclosure

The present disclosure is directed to the field of paper document management, and more particularly to file fasteners having bendable prongs and attaching same to a backboard.

2. Description of the Related Art

Paper fasteners have been used for decades to bind paper documents into file folders. They are typically formed from a base plate with two orthogonal prongs extending from the ends of the base plate and which are themselves bendable.

In the most prevalent configuration, the fastener also includes a compressor plate which is used at the end of the prongs to provide a secure lock on the prongs.

I have made improvements to this prior art system which is described in U.S. patent application Ser. No. 13/293,422 filed 2011 Nov. 10 entitled Protected Pronged File Fastener, which is hereby incorporated by reference in its entirety. This new protected fastener is best used when affixed to a backboard, such as pressboard. I have found however, that all fasteners which are affixed by adhesive (rather than mechanically) to backboards like pressboard, have adherence problems. These problems typically result from the method of affixation which is some form of using adhesive/glue typically hot melt, and applying the fastener by compression. What I found though, is that pressboard and other backing materials resist impregnation by adhesive and the fastener may fall off due to the large torque forces which occur when the fastener is attached to a bundle of papers. Just flipping to the back of the bundle can rip the fastener off its backboard.

BRIEF SUMMARY

The disclosure includes these combinations amongst others.

A method of securely bonding a pronged file fastener having a fixation base onto a backboard, along a conveyor terminating at a hammer and anvil, comprising steps of:
  a. applying a hot melt adhesive on side of the fixation base of the fastener;
  b. conveying the fastener along a conveyer with adhesive side up;
  c. heating the fastener along the conveyor from underneath the base;
  d. deflecting rising heat above the fixation base back down upon the base with a deflector which is closer to the conveyor at its proximal end and more distant therefrom at the proximal end adjacent the anvil;
  e. depositing a fastener into the anvil and driving the hammer;
  f. inserting a backboard in between the anvil and hammer and driving the hammer toward the anvil thereby attaching the fastener to the backboard.

The disclosure also includes a method wherein the hammer has a compressible portion and wherein the hammer is compressed when contacting anvil.

The disclosure also includes a method wherein the anvil has a compressible portion and wherein the anvil is compressed when contacting hammer.

The disclosure also includes a method wherein adhesive is applied to the base and then portions of the adhesive are removed to form bead lines separated by areas devoid of adhesive.

The disclosure also includes a method further including the step of removing an area of adhesive adjacent to the peripheral edge of the base.

The disclosure also includes a method further including the step of removing an area of adhesive adjacent to the peripheral edge of the longitudinal edges of the base.

The disclosure also includes a system for securely bonding a pronged file fastener having a fixation base onto a backboard comprising:
  a conveyor for transporting a plurality of fasteners from a source end to a termination end;
  a bonding station including an anvil and hammer located adjacent to the termination end;
  a heater located under at least a portion of the conveyor;
  a heat deflector located directly above the conveyor and having a proximal end and a distal end, the distal end being located near the bonding station and being higher above the conveyor than the proximal end; so that heat rising above the conveyor will flow toward the distal end;
  a pair of spaced apart rails above said conveyor but in contact with at least a portion of said fastener in the region of the heater for maintaining said fastener adjacent the heater;
  wherein said anvil includes an elastic portion for dampening contact with the hammer, and wherein said hammer includes an elastic portion for dampening contact with the anvil.

The disclosure also includes a system further including an adhesive applicator for applying adhesive across the upper face of the fixation base and an adhesive removing trowel having a plurality of spaced apart lands which are configured to remove adhesive on said upper face to create a plurality of adhesive lines with areas without adhesive.

The disclosure also includes a system further including an adhesive applicator for applying adhesive beads across the upper face of the fixation base with no adhesive applied adjacent at least two longitudinal edges of the upper face.

The disclosure also includes a system wherein said heat deflector is pivotally connected at said proximal end so that it may be lifted to access the conveyor.

The disclosure also includes a system wherein said heat deflector is angled upwardly 2-5 degrees from its proximal to distal end.

The disclosure also includes an apparatus for securely bonding a pronged file fastener having a fixation base onto a backboard comprising:
  a. a conveyor having a source and distal end point for transporting a plurality of fasteners from a source end to a distal end;
  b. a heater located under at least a portion of the conveyor;
  c. a heat deflector located directly above the conveyor and having a proximal end and a distal end, the distal end being higher above the conveyor than the proximal end; so that heat rising above the conveyor will flow toward the distal end;
  d. a pair of spaced apart contact rails above said conveyor but configured to contact at least a portion of said fastener in proximate the heater for maintaining said fastener adjacent the heater.

The disclosure also includes an apparatus further including a bonding station located adjacent said distal end of said conveyor said bonding station including an anvil and hammer, and wherein said anvil includes an elastic portion for dampening contact with the hammer.

The disclosure also includes an apparatus wherein said elastic portion includes an upper and lower portion joined by at least one resilient member.

The disclosure also includes an apparatus wherein said anvil includes an elastic impact surface.

The disclosure also includes an apparatus wherein the heat deflector includes a roof having a longitudinal apex along its length.

The disclosure also includes an apparatus wherein the heat deflector includes a pivot at its proximal end for accessing the conveyor.

The disclosure also includes an apparatus wherein said impact surfaces is silicone.

The disclosure also includes an apparatus wherein said impact surface includes a recess to accommodate at least part of the fastener.

The disclosure also includes an apparatus further including an adhesive scraper having a plurality of lands alternating with recesses for removing a portion of adhesive applied to said fixation base.

The summary provided is intended to help the reader understand some aspects of the invention. The scope of the invention is defined by the claims as read with the specification and cannot be determined by this summary.

DETAILED DESCRIPTION

Pronged fasteners are used primarily to attach documents into folders. They provide the advantage over ringed binders in that they are very compact and can adapt to varying thicknesses of documents and remain compact.

An early example of such a binder is found in U.S. Pat. No. 1,978,569 to Dayton dating back to 1934. For 75+ years, this has remained the dominate form of prong binder such as shown in the commercial product. Modifications of the concept such as U.S. Pat. No. 2,477,417 to Pitt worked with the compressor concept but the basic metal base two prong bendable binder is still the standard of the industry today. Even in 1992, patents were being granted on variations of the same product which suffers from the same defects as the original product (see U.S. Pat. No. 5,096,323 to Walker).

In the co-pending application of common assignee, U.S. patent application Ser. No. 13/293,422 filed 2011 Nov. 10 entitled Protected Pronged File Fastener, which is hereby incorporated by reference in its entirety, a new type of fastener was disclosed.

This new fastener, as well as prior art style fasteners are typically attached/bonded to a backboard of a file folder or similar office requisite (referred to generically as a "file folder"). The most common type of backboard is pressboard which is a composite multi-layered paper material which typically includes a smooth top layer for aesthetic and functional reasons. This smooth layer typically has some degree of water resistance and consequently, is also resistant to the penetration of a bonding adhesive.

When a file folder is heavily loaded with papers, say, 5 cm thick, if the papers are flipped over, the torque on the fastener is significant and if it is not sufficiently bonded to the top surface of the pressboard, it will detach destroying the folder.

To solve this problem, I have found that the there is a need to make improvements in the affixation process and affixation apparatus.

In broader terms, there is a need to increase the bonding time, increase the bonding pressure but to do so without damaging the fastener from pressure or heat. These objectives are obviously contradictory, so I have determined that they can only be achieved by subtle, but important, processes and apparatus. Several processes and apparatuses are disclosed and each one helps achieve the objective. Combining all of them is preferred but not required, so that any of these can be used alone or together in any combination.

The present solution can be applied to any fastener system, but for purposes of this disclosure, the protected pronged fastener of U.S. patent application Ser. No. 13/293,422 is used for illustration.

Figure 1:
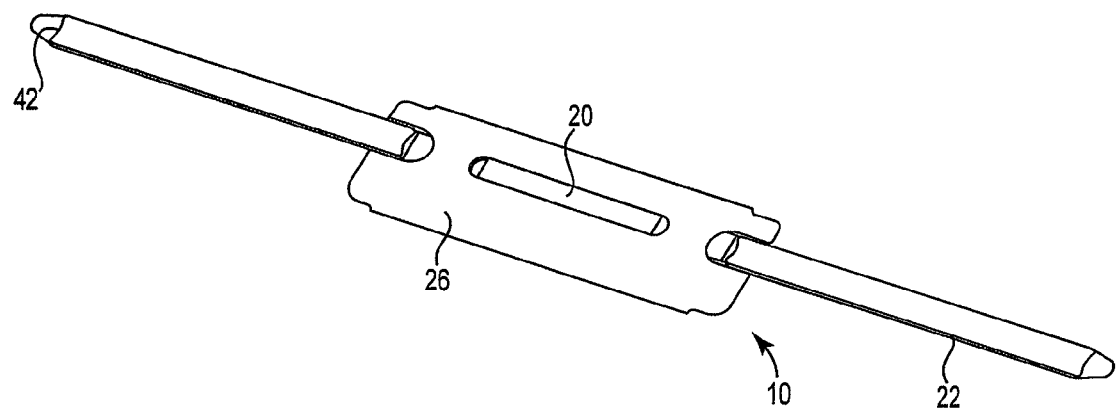
FIG. 1 illustrates a perspective view of a protected pronged fastener.
Figure 2:
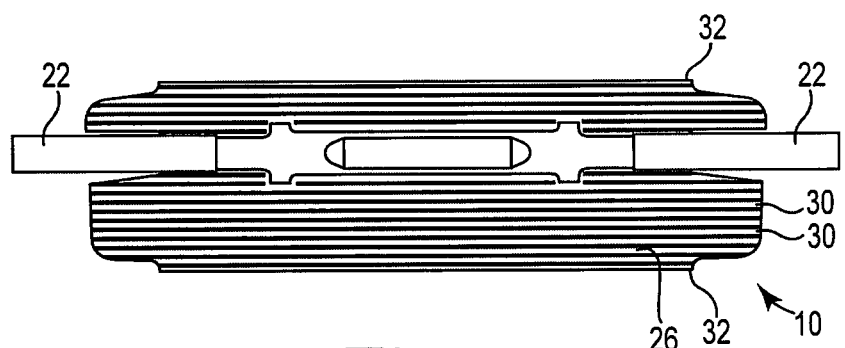
FIG. 2 is a bottom plan view a portion of the fastener in FIG. 1.

In one embodiment as shown in FIGS. 1 and 2, a two prong binder/fastener 10 is shown. The version shown is a "bonded" type, meaning it is self contained and can be affixed to a file folder without punching the folder. The bonding feature is known in the art such as in Smead® Manufacturing Company product part number 24600. In interior structure of the fastener 10 is shown in FIG. 2, where the fastener/binder 10 has a longitudinal base section 20, with bendable prongs 22 extending from both ends thereof. In this embodiment, the base is affixed to a fixation base 26 preferably of fiber material which itself is then bonded to a file folder or the like, by adhesive, preferably hot melt.

It is known in the art to coat the entire fixation base 26 with adhesive on the side which is to be attached to the pressboard (not shown but an example of pressboard is found in U.S. patent application Ser. No. 13/293,422, FIG. 8d). In order to get greater affixation, one needs to heat the fastener either to a higher temperature than known in the art or for a longer period. Both actions would cause the glue to spread beyond the edges of the fixation base 26 and ultimately stick to papers in the file or to the other backboard of the file, both of which would be unacceptable. I might also melt a fastener component or the protected prongs.

Instead, I have determined that applying the adhesive in a strip pattern as shown in FIG. 2 with a plurality of beads of adhesive 30 separated by spaces/gaps 32, will allow the glue to flow to the spaces and generally not off the edge of the base. In addition, is it is possible to provide a peripheral area on the fixation base 26 which has no glue so that the closest bead near the edge has a flow path with will end at the edge. The peripheral edge can be the entire perimeter, but also the two longitudinal (longest) edges with the short orthogonal edges not being cleared of glue, or the opposite. If the glue bead is appropriately adjusted, the edge of the fixation base creates a limited barrier edge (a micro lip at the cut edge) glue will flow along the edge without crossing the barrier. Cohesion of the glue may also limit flow over the edge.

Figure 3:
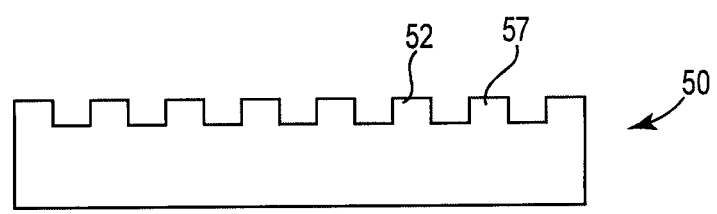
FIG. 3 is a schematic end view of a glue spreader trowel.

The glue can be applied by means of a trowel type device 50 which is shown in an end view in FIG. 3 which has a plurality of lands (projections) and recesses therebetween. In the preferred embodiment the glue is applied to the entire surface of fixation base 26, but then the trowel having teeth 52, remove or scrap away the glue from areas 32 to provide a largely glue free area between beads of glue 30. The trowel can be a blade which by mechanical arm or other known systems for moving the trowel, passes over fasteners, typically orthogonally to the movement of the conveyor, as they stream. The bead lines 30 can also be done orthogonally to what is shown preferably with a non-glue area around the entire periphery for the reasons described above, or around only two edges of the periphery because this requires fewer steps and the remaining longitudinal edges of the glue beads are not particularly troublesome as they have only end points in their lateral direction. It would also be possible to wipe a peripheral band at the edge free of glue with or without creating bead lines. This would give the glue an expansion area to flow outwardly without overflowing the edges.

It is possible to apply the glue in beads without a trowel/scraper by applying the glue in beads directly, and in such case, the periphery can be kept clear by careful placement.

With the glue applied, the next step is heating the fastener and than attaching it to the backboard/pressboard. FIGS. 4-10 illustrate various features of these steps and the associated apparatus.

In the preferred embodiment a plurality of fasteners 10 are placed in a conveyor track 60 (FIG. 5) having a plurality of spaced apart recesses 62 sized to receive the tangs 22 of the fastener.

Underneath the belt are heating elements (FIG. 9) which apply a convective heat to the fasteners which pass by. (Heat may alternatively be applied from above 70*a* FIG. 8.) In any case, it is preferable to have the glue side up so that it does not drip.

Figure 6:
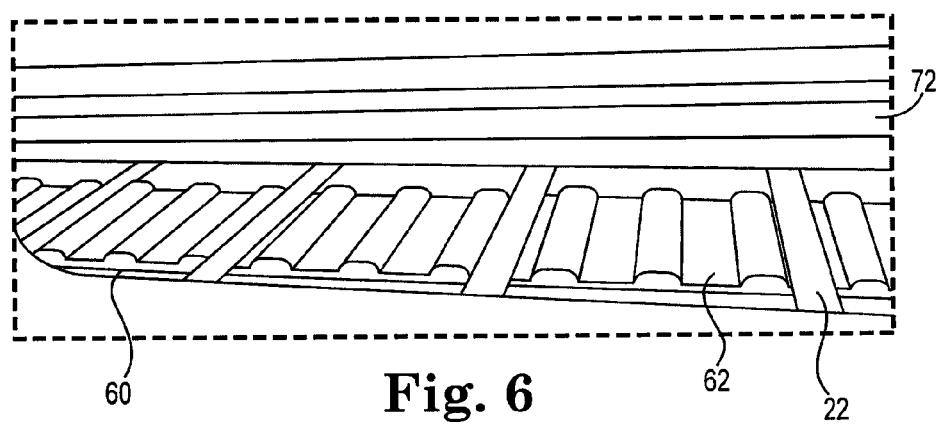
FIG. 6 is a view side perspective view of a portion of the conveyor with rails engaging the tangs of the fastener.
Figure 7:
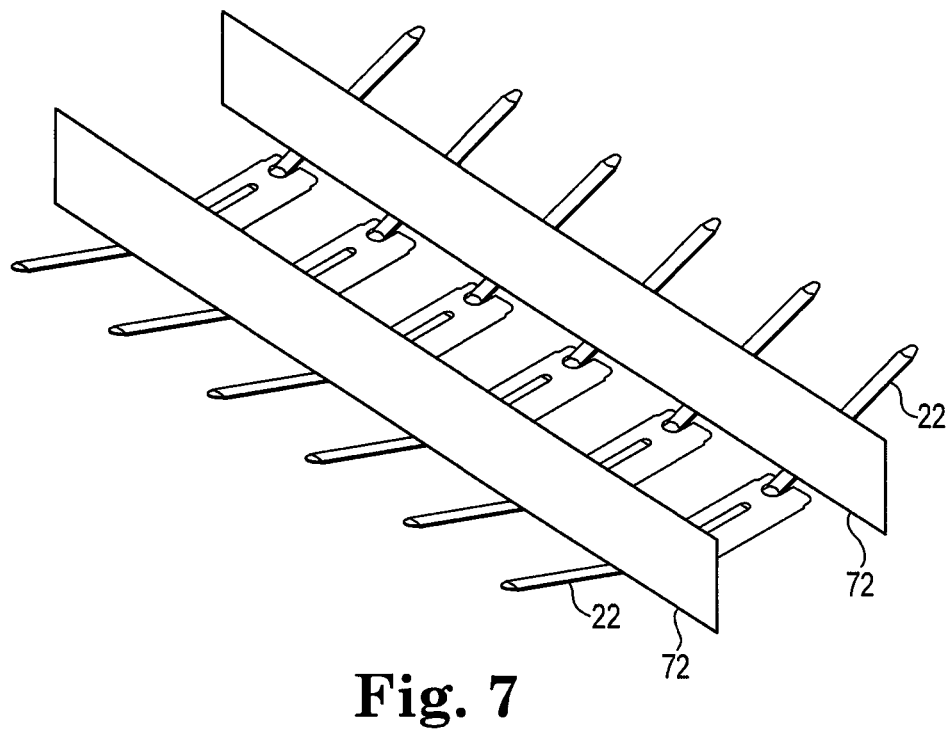
FIG. 7 is a top perspective view of the rails of FIG. 6.
Figure 8:
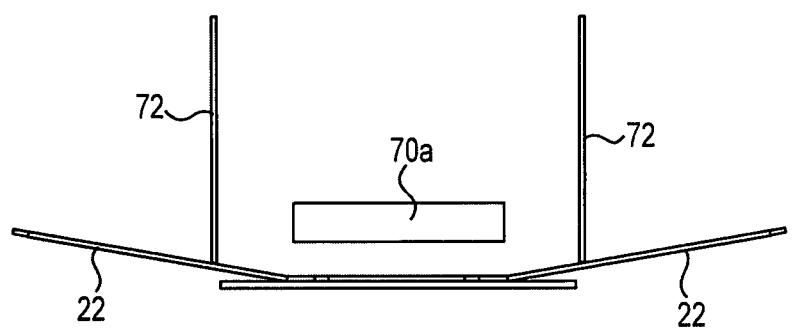
FIG. 8 is a side view of the rails of FIG. 6.
Figure 9:
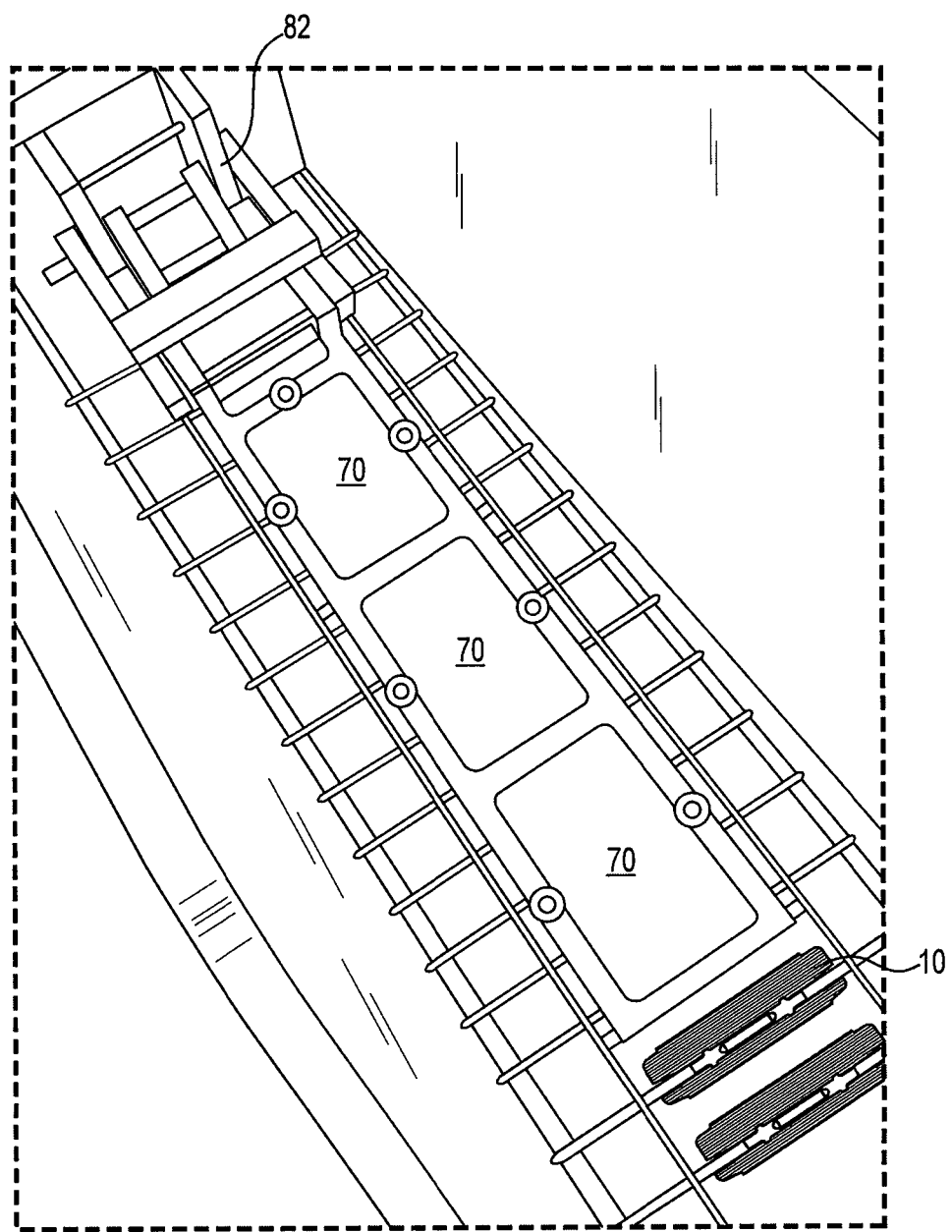
FIG. 9 is a top perspective view of the conveyer showing a heating system and fasteners with the hinge for the heat shield shown.

In order to impart the maximum amount of heat to the fastener in the shortest time and without melting the fastener or the protected tangs, rails 72, shown in FIGS. 6, 7, 8 contact and apply pressure on the tangs or at least adjacent the central/glued section of the fastener to bias the central region downwardly toward the heater elements. FIGS. 7-8 show a slight bend to the tang during compression by the rails, though the drawings show this as very exaggerated to make it visible. The deflection is slight so that in the preferred embodiment, when released, the tangs resume their planar position without deflection, however the pressure of the rails drives the glued portion of the fastener toward the heater which brings the hot melt adhesive up to proper temperature more quickly. The rails 72 can also be a roller or plurality of rollers or other structure to apply pressure on the fastener to keep it adjacent to the heater preferably up and till it reaches the bonding station 90.

In order to keep the hot melt glue at its optimum temperature, it is helpful to keep the heat focused on the glue side. Raising the temperature beyond a certain point will cause the glue to flow in undesirable ways, so maintaining the temp is more effective than overheating and allowing for cooling.

Figure 4:
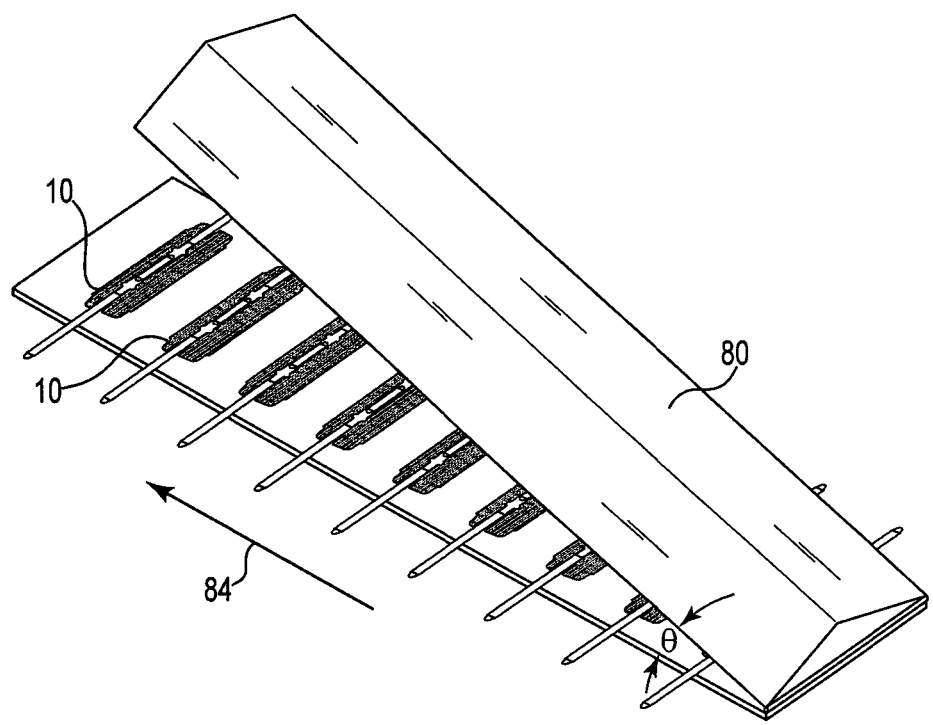
FIG. 4 is a perspective view of a portion of a conveyor holding fasteners over a heating element with a hood shown (angle theta exaggerated).
Figure 5:
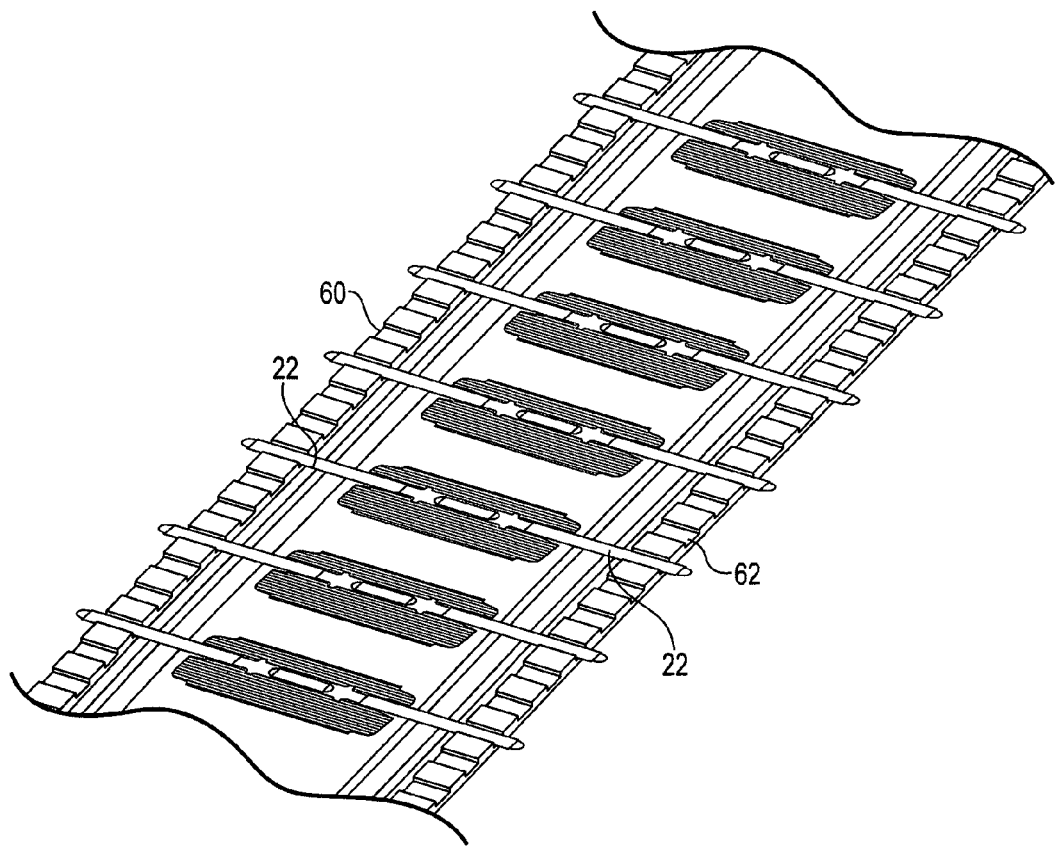
FIG. 5 is a perspective view of a portion of the conveyor in FIG. 4.
Figure 10:
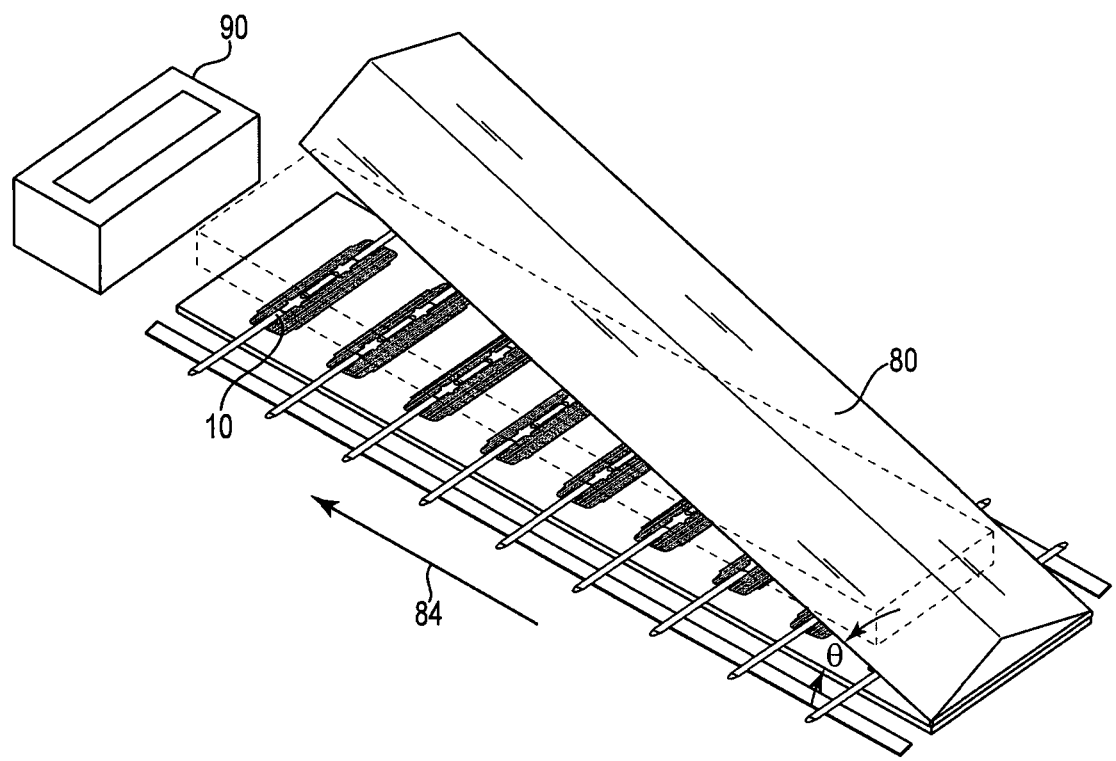
FIG. 10 is a figure like FIG. 4 except with an anvil and hammer shown.

To accomplish this, a heat deflector/chimney is provided. It is attached by a pivot 82 (FIG. 9) for easy access removal but it normally resides adjacent to the conveyor at an angle theta preferably 2-5 degrees above the conveyor. FIGS. 4 and 10 show the angle highly exaggerated to make it visible. The angle of the heat deflectors is selected to create a chimney effect, by providing an slight upward path for heat. This insures that the maximal amount of heat will follow in the direction of the conveyor 84 as the fasteners approach the compression system 90 of an anvil and hammer. The natural tendency of heat is to move upwardly, creating a flow which moves distally along the conveyor which in turn keeps more heat applied to the glue portion as it reaches the bonding station 90.

After sufficient heating, the fasteners are ready for bonding to the backboard, typically pressboard or similar. I have found that traditional anvil/hammer bonding does not create an adequate bond. This is because such a traditional system is typically high impact/low duration which make momentary contact but does not allow sufficient time for penetration of the adhesive into the backboard. I have devised several structures and methods to lengthen the duration of contact/impact time without having to increase force.

Figure 11:
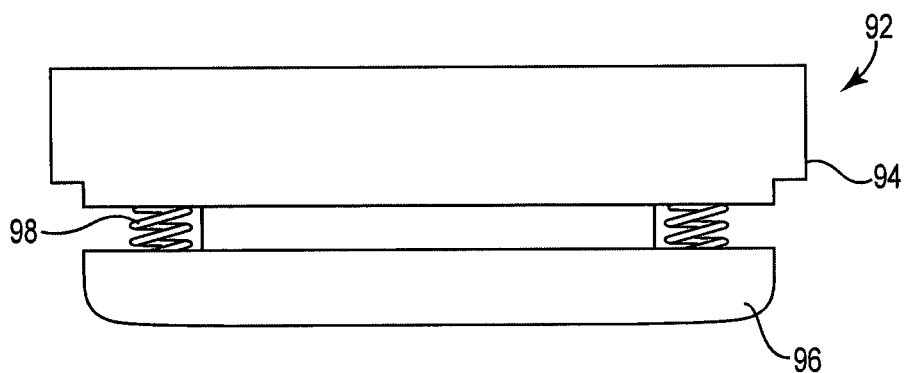
FIG. 11 is a side plan view of hammer used to compress the fastener against an anvil with a backboard intermediary.
Figure 12:
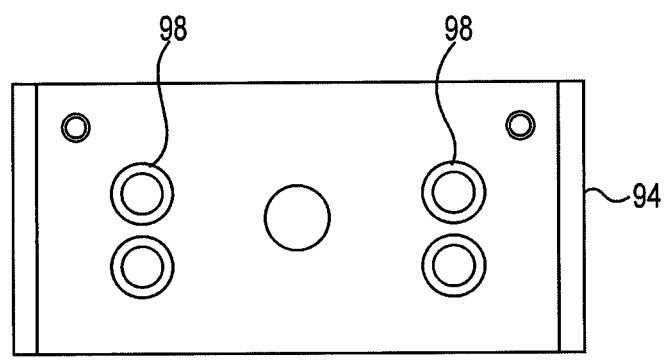
FIG. 12 is a bottom plan view of the static portion of the hammer and springs.

As shown in FIGS. 11-12, the bonding station 90 includes a two part hammer 92 is shown with an upper part 94 and a lower part 96 connected by four spaced apart springs 98. The spring biased hammer slows the impact (pressure/time) allowing the glue additional time to spread and penetrate the backboard.

Figure 13:
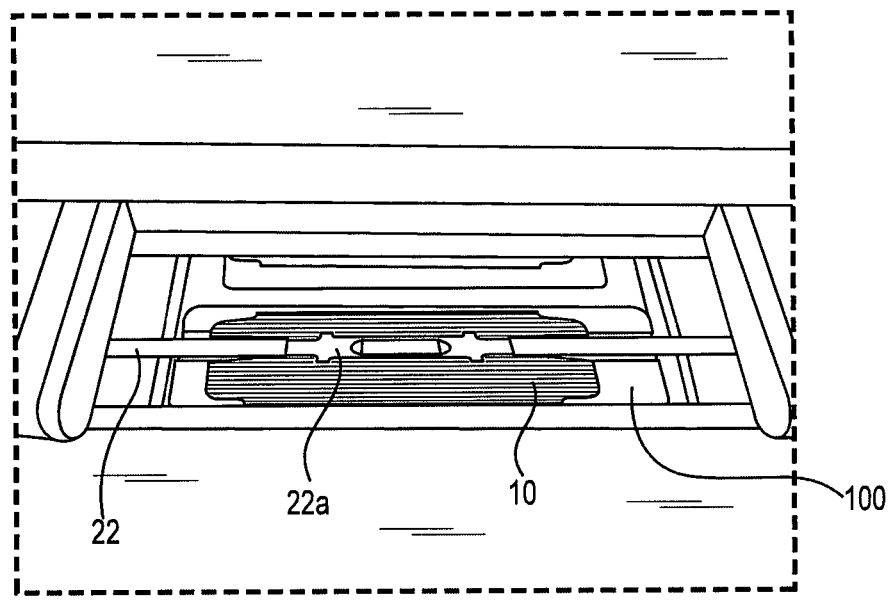
FIG. 13 is a perspective view of a fastener sitting in the anvil prior to attachment.
Figure 14:
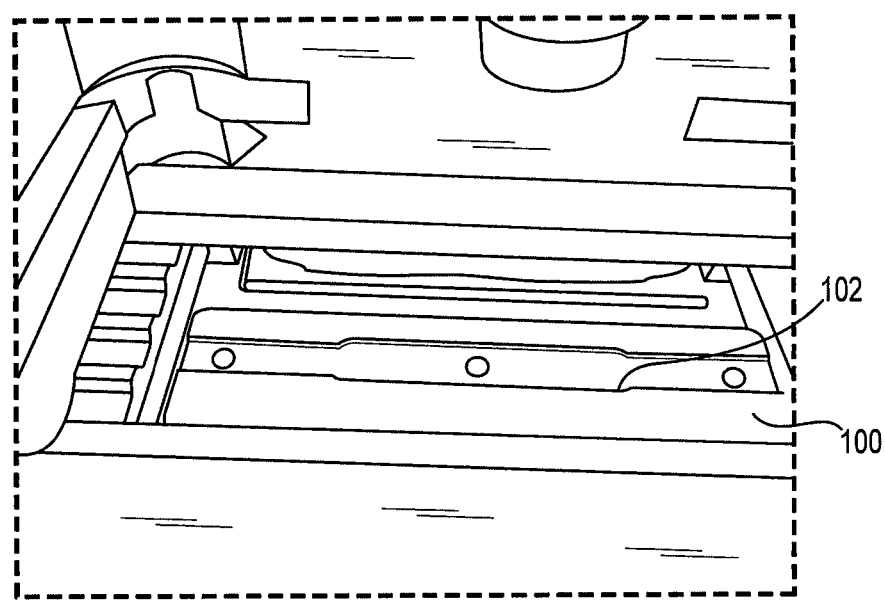
FIG. 14 is a perspective view of the anvil with fastener removed

The anvil 100 is shown in FIGS. 13-14 and has a recessed area 102 which preferably allows for the tang portions 22 and the metallic portion 22*a* which connect the tang portion to sit in the recess. This keeps the contact surface of the fixation base 26 planar so that all portions thereof make generally equal contact with the backboard when bonding occurs. Additionally, the anvil is preferably made of a relatively hard, but elastic silicon or other plastic like material so that it, like springs 98, slows the impact, distributes the force and lengthens the time the contact bonding occurs. The anvil can also be made of steel with a coating of elastic material. The effect of either or both of the elastic features of the anvil/hammer result in a superior bond without the damaging effect of merely increasing the contact pressure or time.

It is understood that this process can be computer controlled by a computer with memory and a processor wherein the computer controls the heating of the fasteners, the speed of the conveyor, the timing of the bonding unit (anvil/hammer) and the speed of the entire process.

The description above and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A system for securely bonding a pronged file fastener having a fixation base onto a backboard comprising:
   a. a conveyor for transporting a plurality of fasteners from a source end to a termination end;
   b. a bonding station including an anvil and hammer located adjacent the termination end;
   c. a heater located under at least a portion of the conveyor;

d. a heat deflector located directly above the conveyor and having a proximal end and a distal end, the distal end being located near the bonding station and being higher above the conveyor than the proximal end; so that heat rising above the conveyor will flow toward the distal end;

e. a pair of spaced apart rails above said conveyor but in contact with at least a portion of said fastener in the region of the heater for maintaining said fastener adjacent the heater;

f. wherein said anvil includes an elastic portion for dampening contact with the hammer, and wherein said hammer includes an elastic portion for dampening contact with the anvil.

2. The system of claim 1, further including an adhesive applicator for applying adhesive across the upper face of the fixation base and an adhesive removing trowel having a plurality of spaced apart lands which are configured to remove adhesive on said upper face to create a plurality of adhesive lines with areas without adhesive.

3. The system of claim 1, further including an adhesive applicator for applying adhesive beads across the upper face of the fixation base with no adhesive applied adjacent at least two longitudinal edges of the upper face.

4. The system of claim 1, wherein said heat deflector is pivotally connected at said proximal end so that it may be lifted to access the conveyor.

5. The system of claim 1, wherein said heat deflector is angled upwardly 2-5 degree from its proximal to distal end.

6. An apparatus for a system for securely bonding a pronged file fastener having a fixation base onto to a backboard comprising:

a. a conveyor having a source and distal end point for transporting a plurality of fasteners from a source end to a distal end;

b. a heater located under at least a portion of the conveyor;

c. a heat deflector located directly above the conveyor and having a proximal end and a distal end, the distal end being higher above the conveyor than the proximal end; so that heat rising above the conveyor will flow toward the distal end;

d. a pair of spaced apart contact rails above said conveyor but configured to contact at least a portion of said fastener in proximate the heater for maintaining said fastener adjacent the heater.

7. The apparatus of claim 6, further including a bonding station located adjacent said distal end of said conveyor said bonding station including an anvil and hammer, and wherein said anvil includes an elastic portion for dampening contact with the hammer.

8. The apparatus of claim 7, wherein said elastic portion includes an upper and lower portion joined by at least one resilient member.

9. The apparatus of claim 7, wherein said anvil includes an elastic impact surface.

10. The apparatus of claim 6, wherein the heat deflector includes a roof having a longitudinal apex along its length.

11. The apparatus of claim 6, wherein the heat deflector includes a pivot at its proximal end for accessing the conveyor.

12. The apparatus of claim 9, wherein said impact surface is silicone.

13. The apparatus of claim 9, wherein said impact surface includes a recess to accommodate at least part of the fastener.

14. The apparatus of claim 6, further including an adhesive scraper having a plurality of lands alternating with recesses for removing a portion of adhesive applied to said fixation base.

* * * * *